United States Patent
Kosaka et al.

(10) Patent No.: US 11,768,118 B2
(45) Date of Patent: Sep. 26, 2023

(54) FORCE SENSOR

(71) Applicants: Yusuke Kosaka, Chofu (JP); Eiji Niwa, Sendai (JP)

(72) Inventors: Yusuke Kosaka, Chofu (JP); Eiji Niwa, Sendai (JP)

(73) Assignees: TOYOTA JIDOSHA KABUSHIKI KAISHA, Toyota (JP); RESEARCH INSTITUTE FOR ELECTROMAGNETIC MATERIALS, Tomiya (JP)

( * ) Notice: Subject to any disclaimer, the term of this patent is extended or adjusted under 35 U.S.C. 154(b) by 30 days.

(21) Appl. No.: 17/358,557

(22) Filed: Jun. 25, 2021

(65) Prior Publication Data
US 2021/0404896 A1 Dec. 30, 2021

(30) Foreign Application Priority Data
Jun. 29, 2020 (JP) .................. 2020-111196

(51) Int. Cl.
*G01L 5/16* (2020.01)
*G01L 1/22* (2006.01)
*G01L 5/1627* (2020.01)

(52) U.S. Cl.
CPC .......... *G01L 5/1627* (2020.01); *G01L 1/2262* (2013.01)

(58) Field of Classification Search
CPC ........................... G01L 5/1627; G01L 1/2262
See application file for complete search history.

(56) References Cited

U.S. PATENT DOCUMENTS

| 5,386,724 A | * | 2/1995 | Das | ............. E21B 47/007 73/152.59 |
| 2002/0092364 A1 | * | 7/2002 | Adderton | ............. B60C 11/00 73/862.41 |

(Continued)

FOREIGN PATENT DOCUMENTS

| ES | 2566048 | * | 4/2016 | ............. G01M 17/02 |
| JP | H03-078637 A | | 12/1991 | |

(Continued)

OTHER PUBLICATIONS

Office Action dated Jan. 20, 2023 in the related U.S. Appl. No. 17/358,666, filed Jun. 25, 2021.

(Continued)

*Primary Examiner* — Alexander Satanovsky
*Assistant Examiner* — Sharah Zaab
(74) *Attorney, Agent, or Firm* — Dinsmore & Shohl LLP (57) ABSTRACT

A force sensor includes a first structure, four strain generation parts, and a second structure connected to the first structure with the strain generation parts interposed therebetween. The strain generation part includes a first connection part connected to the first structure, a first branch part, which is a beam-like part branching into two from the first connection part toward the second structure and extending in directions separating from each other, a second branch part, which is a beam-like part connected to the first branch part with bent parts interposed therebetween and extending in directions approaching each other, and a second connection part where branched parts of the second branch part join and connects to the second structure. The strain generation parts are formed so that the strain generation parts become line-symmetric with respect to the first and second axes when projected in a direction perpendicular to the reference plane.

9 Claims, 9 Drawing Sheets

(56) References Cited

U.S. PATENT DOCUMENTS

| | | |
|---|---|---|
| 2005/0120809 A1 | 6/2005 | Ramming |
| 2015/0033875 A1* | 2/2015 | Meyer .................... G01L 1/26 73/862.041 |
| 2020/0309617 A1 | 10/2020 | Mukai et al. |
| 2020/0309626 A1 | 10/2020 | Mukai et al. |
| 2021/0404890 A1 | 12/2021 | Kosaka et al. |

FOREIGN PATENT DOCUMENTS

| | | | | |
|---|---|---|---|---|
| JP | 2013-011567 A | | 1/2013 | |
| JP | 2013011567 | * | 1/2013 | ............... G01L 3/10 |
| JP | 2016161492 | * | 9/2016 | ............... G01L 1/22 |
| JP | 2018-146309 A | | 9/2018 | |
| JP | 2018205141 | * | 12/2018 | ............... G01L 1/00 |
| KR | 102183179 B1 | | 11/2020 | |
| WO | 2008/067392 A2 | | 6/2008 | |

OTHER PUBLICATIONS

Notice of Allowance dated Jun. 8, 2023 issued to related U.S. Appl. No. 17/358,666, filed Jun. 25, 2021.

* cited by examiner

FORCE SENSOR

CROSS REFERENCE TO RELATED APPLICATIONS

This application is based upon and claims the benefit of priority from Japanese patent application No. 2020-111196, filed on Jun. 29, 2020, the disclosure of which is incorporated herein in its entirety by reference.

BACKGROUND

The present disclosure relates to a force sensor.

A force sensor for detecting a force or a moment when a predetermined force is transmitted from one structure to another structure through a strain generation part extended between the two structures is known. The force sensor calculates a force in a desired axial direction and a moment about a desired axis by detecting a strain generated in the strain generation part.

For example, Japanese Unexamined Patent Application Publication No. 2013-011567 discloses a torque measurement apparatus including metallic and beam-like strain generation parts extended between a primary structure and a secondary structure. Further, torque is transmitted from one structure to another structure through the strain generation parts. The torque measurement apparatus includes thin-film type strain sensors arranged on a surface perpendicular to a torque central axis of the strain generation parts that detect an amount of strain in the strain generation parts, and a signal processing unit that directly calculates torque based on the amount of strain detected by the thin-film type strain sensors.

SUMMARY

However, the torque measurement apparatus disclosed in Japanese Unexamined Patent Application Publication No. 2013-011567 is limited to measuring torque around the torque central axis and cannot detect, for example, other forces and directions in three-axis orthogonal coordinates. On the other hand, for example, a six-axis force sensor for detecting a force or a moment in a three-axis orthogonal coordinate system has been developed. However, in such a force sensor, it is necessary to calculate a desired force or a desired moment by inputting strain detected by a plurality of strain sensors into a decoupling matrix and performing complicated calculations.

An object of the present disclosure is to provide a force sensor which does not require a complicated calculation.

An first example aspect of the present disclosure is a force sensor for detecting at least one of a force in each axial direction and a moment about each axis of a Cartesian coordinate system including a first axis, a second axis, and a third axis orthogonal to each other. The force sensor includes a first structure, four strain generation parts, and a second structure. The first structure is formed in such a way that the third axis passes therethrough. The four strain generation parts each extend radially from the first structure along the first axis and the second axis on a reference plane formed by the first axis and the second axis. The second structure is connected to the first structure with the strain generation parts interposed therebetween. Each of the strain generation parts includes a first connection part, a first branch part, a second branch part, and a second connection part. The first connection part is connected to the first structure. The first branch part is a pair of beam-like parts branching into two from the first connection part toward the second structure and extending in directions separating from each other. The second branch part is a pair of beam-like parts both connected to the first branch part with bent parts interposed therebetween and extending in directions approaching each other. The second connection part is a part where the branched parts of the second branch part join and connects to the second structure. The strain generation parts are formed in such a way that the strain generation parts become line-symmetric with respect to both the first axis and the second axis when the strain generation parts are projected in a direction perpendicular to the reference plane.

With such a configuration, the strain generation parts included in the force sensor can easily separate the strain in the direction of the applied force when the force is applied in each axial direction.

The above force sensor may further include a plurality of strain sensor pairs on the reference plane of the strain generation parts. In some embodiments, the plurality of strain sensor pairs are arranged in such a way that the strain sensor pairs become line-symmetric with respect to both the first axis and the second axis when the plurality of strain sensor pairs are projected in a direction perpendicular to the reference plane. In this way, the force sensor can detect an external force without performing a complicated decoupling calculation.

In the above force sensor, the plurality of strain sensor pairs may include at least one of a first sensor group, a second sensor group, a third sensor group, a fourth sensor group, a fifth sensor group, and a sixth sensor group. The first sensor group includes the plurality of strain sensor pairs arranged in at least one of the first branch part and the second branch part of the strain generation part formed along the first axis. The second sensor group includes the plurality of strain sensor pairs arranged in at least one of the first branch part and the second branch part of the strain generation part formed along the second axis. The third sensor group includes the plurality of strain sensors arranged in the first connection part and the second connection part on the first axis or the second axis. The fourth sensor group includes the plurality of strain sensor pairs arranged in the first connection part and the second connection part on the second axis. The fifth sensor group includes the plurality of strain sensor pairs arranged in the first connection part and the second connection part on the first axis. The sixth sensor group includes at least either of the plurality of strain sensor pairs arranged across the first axis in the first connection part provided on the first axis or the plurality of strain sensor pairs arranged across the second axis in the first connection part provided on the second axis.

With such a configuration, the force sensor can suitably detect an external force corresponding to each sensor group.

In the above force sensor, the strain generation parts may be formed so as to be four-fold symmetric with respect to the third axis, and the plurality of strain sensor pairs may be arranged so as to be four-fold symmetric with respect to the third axis. Thus, the force sensor can detect the six-axis force in a balanced manner.

The above force sensor may further include at least one of a first force detection circuit, a second force detection circuit, a third force detection circuit, a first moment detection circuit, a second moment detection circuit, and a third moment detection circuit. The first force detection circuit includes a bridge circuit and is configured to detect a force in a direction of the first axis, the bridge circuit including the plurality of strain sensor pairs included in the first sensor group. The second force detection circuit includes a bridge circuit and is configured to detect a force in a direction of the second axis, the bridge circuit including the plurality of strain sensor pairs included in the second sensor group. The third force detection circuit includes a bridge circuit and is configured to detect a force in a direction of the third axis, the bridge circuit including the plurality of strain sensor pairs included in the third sensor group. The first moment detection circuit includes a bridge circuit and is configured to detect a moment about the first axis, the bridge circuit including the plurality of strain sensor pairs included in the fourth sensor group. The second moment detection circuit includes a bridge circuit and is configured to detect a moment about the second axis, the bridge circuit including the plurality of strain sensor pairs included in the fifth sensor group. The third moment detection circuit includes a bridge circuit and is configured to detect a moment about the third axis, the bridge circuit including the plurality of strain sensor pairs included in the sixth sensor group.

Thus, the force sensor can separate the external force into each axial force and detect the external force without performing a complicated decoupling calculation.

In the first force detection circuit of the above force sensor, the first sensor group may include the plurality of strain sensor pairs in both the first branch part and the second branch part. In this way, the force sensor can improve the reliability of the first sensor group.

In the second force detection circuit of the above force sensor, the second sensor group may include the plurality of strain sensor pairs in both the first branch part and the second branch part. In this way, the force sensor can improve the reliability of the second sensor group.

In the third force detection circuit of the above force sensor, the third sensor group may include the plurality of strain sensor pairs in the first connection part and the second connection part on the first axis and the second axis. In this way, the force sensor can improve the reliability of the third sensor group.

In the third moment detection circuit of the above force sensor, the sixth sensor group may include the plurality of strain sensor pairs in both the first connection part provided on the first axis and the first connection part provided on the second axis. In this way, the force sensor can improve the reliability of the sixth sensor group.

According to the present disclosure, it is possible to provide a force sensor which does not require a complicated calculation.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, the present disclosure will be described through an embodiment of the disclosure, but the disclosure according to the claims is not limited to the following embodiment. For clarity of illustration, the following description and drawings have been omitted and simplified as appropriate. In the drawings, the same elements are denoted by the same reference signs, and repeated description is omitted as necessary.

Embodiment

A force sensor according to an embodiment detects a force or a moment transmitted between two structures by being interposed between the two structures. The force sensor can be used, for example, in joints such as the wrist and ankle of a robot, power steering of an automobile, a power transmission part from a driving motor of a moving apparatus to a wheel installed on a moving surface, or a joystick part of a predetermined controller.

Figure 1:
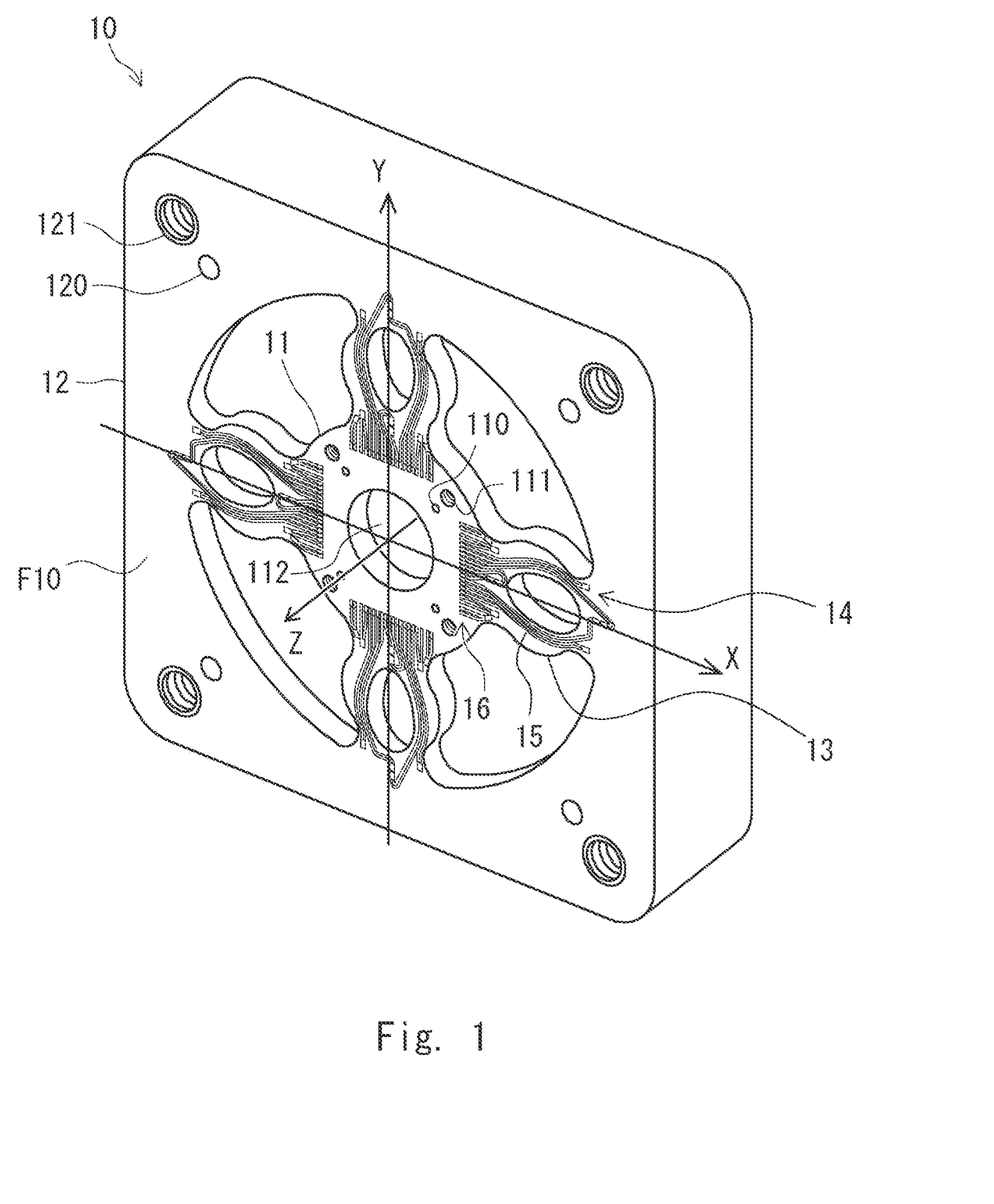
FIG. 1 is a perspective view of a force sensor according to an embodiment.
Figure 2:
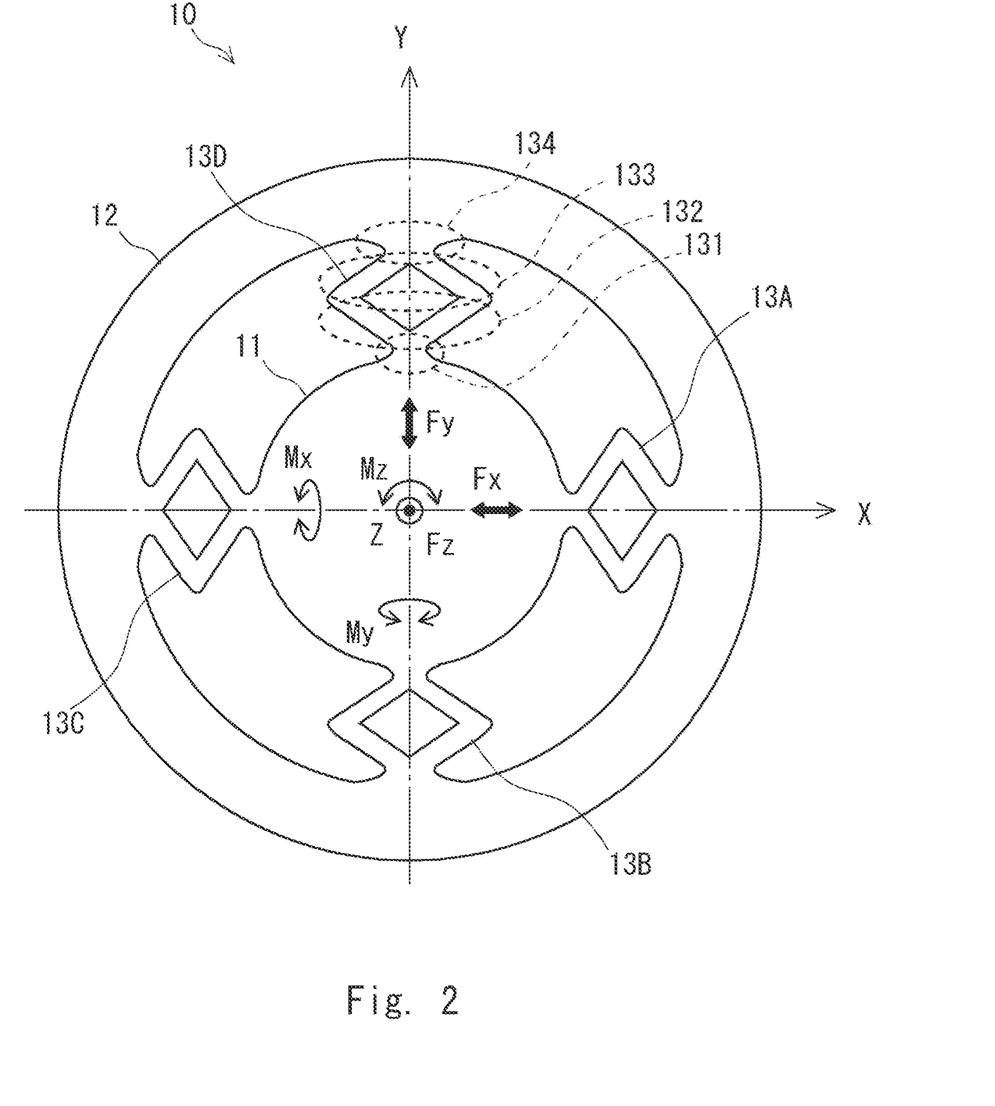
FIG. 2 is a front view of structures of and strain generation parts of the force sensor.

An embodiment of the present disclosure will be described below with reference to the drawings. FIG. 1 is a perspective view of a force sensor 10 according to the embodiment. For convenience of explaining the positional relationship of the components, FIG. 1 shows a right-handed Cartesian coordinate system. In FIG. 2 and the subsequent drawings, when a Cartesian coordinate system is shown, the X-axis, Y-axis, and Z-axis directions of FIG. 1 correspond to the X-axis, Y-axis, and Z-axis directions, respectively, of the Cartesian coordinate system in FIG. 2 and the subsequent drawings. In this embodiment, the X-axis may be referred to as a first axis, the Y-axis may be referred to as a second axis, and the Z-axis may be referred to as a third axis.

The force sensor 10 detects a force in each axis direction and a moment about each axis of the Cartesian coordinate system including the X-axis (the first axis), the Y-axis (the second axis), and the Z-axis (the third axis) that are orthogonal to each other. An entire outer form of the force sensor 10 is a substantially rectangular parallelepiped. In the substantially rectangular parallelepiped force sensor 10, a plane parallel to the XY plane and on the positive side of the Z-axis is a reference plane F10 which has been smoothed. FIG. 1 is a perspective view of the force sensor 10 observed from the reference plane F10 side. As shown in the drawing, the reference plane F10 corresponds to the XY plane of the Cartesian coordinate system. The origin of the Cartesian coordinate system corresponds to the center of the reference plane F10.

The force sensor 10 includes first structures 11, a second structure 12 and strain generation parts 13 as main components. The first structures 11, the second structure 12, and the strain generation parts 13 are formed by cutting one metal member (e.g., stainless steel or aluminum alloy).

The first structure 11 is a hollow cylindrical structure formed around the Z-axis. The first structure 11 includes a reference hole 110, a first positioning hole 111, and a first screw hole 112 opened parallel to the Z-axis. The reference hole 110 is a round hole provided at the center of the first structure 11, and the central axis of the reference hole 110 corresponds to the Z-axis. The first positioning holes 111 are provided at four respective positions equidistant from each other in a radial direction around the Z-axis as the central axis and at equal intervals in a circumferential direction around the Z-axis as the central axis. The first screw hole 112 is provided on an outer peripheral side of the first positioning holes 111 (the side separating from the Z-axis) corresponding to each of the first positioning holes 111 at the four positions. The first structures 11 are connected to the strain generation parts 13 extending radially along the reference plane F10 around the Z-axis on the X-axis positive side, the X-axis negative side, the Y-axis positive side, and the Y-axis negative side, respectively.

The second structure 12 is connected to the first structures 11 with the strain generation parts 13 interposed therebetween. The second structure 12 is formed around the Z-axis so as to surround the first structures 11. The second structure 12 includes second positioning holes 120 and second screw holes 121. The second positioning holes 120 are provided near four respective corners of a contour of a rectangle equidistant from each other in a radial direction around the Z-axis as the central axis and at equal intervals in a circumferential direction around the Z-axis as the central axis. The second screw holes 121 are provided on an outer peripheral side of the second positioning holes 120 corresponding to the respective second positioning holes 120 at the four positions. The second structure 12 is connected to the four strain generation parts 11 extending from the first structures 13 on the X-axis and the Y-axis, respectively.

The strain generation parts 13 are beam-like parts radially extending from the first structures 11 along the X-axis and the Y-axis on the reference plane F10. The force sensor 10 includes four strain generation parts 13. The four strain generation parts 13 included in the force sensor 10 connect the first structures 11 to the second structure 12 on the X-axis positive side, the X-axis negative side, the Y-axis positive side and the Y-axis negative side, respectively.

The force sensor 10 further includes, on the reference plane F10, strain sensors 14, wiring parts 15, and electrodes 16. The plurality of strain sensors 14 are arranged on the reference plane F10 in the strain generation part 13. The strain sensor 14 is configured in such a way that it indicates a predetermined resistance value when a voltage is applied thereto and changes the resistance value when strain is detected. For example, the strain sensor 14 is configured such that the resistance value increases when it is stretched, and the resistance value decreases when it is contracted.

The strain sensor 14 is configured such that an electric signal generated by each strain sensor is transmitted to the electrode 16 through the wiring part 15. The wiring part 15 connects the strain sensor 14 to the electrode 16 so that the signal generated by the strain sensor 14 is transmitted to the electrode 16. The electrode 16 is an interface for transmitting and receiving the electric signal. The electrode 16 is connected to the strain sensor 14 with the wiring part 15 interposed therebetween, and supplies the signal generated by the strain sensor 14 to the outside.

The strain sensors 14, the wiring parts 15, and the electrodes 16 can be provided on the reference plane F10 by, for example, the following steps. First, an insulating coat is formed by sputtering on a stainless steel base material constituting the first structures 11, the second structure 12, and the strain generation parts 13. The insulating coat is, for example, silicon dioxide ($SiO_2$). Next, a film of, for example, chromium nitride (Cr—N) is formed by sputtering as conductive parts of the strain sensors 14, the wiring parts 15, and the electrodes 16 on the formed insulating coat.

Next, gold (Au) is formed on the parts corresponding to the wiring parts 15 and the electrodes 16 by sputtering. Further, silicon dioxide ($SiO_2$) is formed as a protective film on the parts corresponding to the strain sensors 14 and the wiring parts 15. By manufacturing the strain sensors 14, the wiring parts 15, and the electrodes 16 by such a method, it is possible to realize a desired configuration of the force sensor 10 in a space-saving manner. The above-described manufacturing method is already known to a person skilled in the art, and a detailed description of the masking processing, etc. is omitted here.

The strain sensors 14, the wiring parts 15, and the electrodes 16 can be formed not only by the above described steps but also by other methods. For example, the wiring parts 15 and the electrodes 16 can be connected to a conductive member using wire bonding, soldering, or the like. The strain sensors 14 may also be implemented by connecting semiconductor strain gauges or other common strain gauges. The insulating coat and the protective film may be formed by coating or dipping instead of the sputtering step described above.

In the following description, when an external force is applied to the force sensor 10, it is assumed that the first structure 11 is a force receiving part, and the external force received by the first structure 11 is transmitted to the second structure 12 through the strain generation part 13. The first structure 11 may be referred to as a structure on a primary side or an input side, and the second structure 12 may be referred to as a structure on a secondary side or an output side.

Next, the shape of the strain generation part 13 will be described with reference to FIG. 2. FIG. 2 is a front view showing the structures and the strain generation parts of the force sensor. FIG. 2 schematically shows the force sensor 10 with some of components omitted as appropriate in order to explain the shape of the strain generation part 13.

The first structures 11 are connected to the second structure 12 by the four strain generation parts 13. The strain generation parts 13 extend radially along the respective axes from four positions on the X-axis positive side, the X-axis negative side, the Y-axis positive side, and the Y-axis negative side of the first structure 11, respectively, and are connected to the second structure 12 at positions where the respective axes and the second structure 12 intersect with each other.

In the following description, among the four strain generation parts 13, the one positioned on the X-axis positive side is referred to as a strain generation part 13A, the one positioned on the Y-axis negative side is referred to as a strain generation part 13B, the one positioned on the X-axis negative side is referred to as a strain generation part 13C, and the one positioned on the Y-axis positive side is referred to as a strain generation part 13D. In the following description, the strain generation parts 13A to 13D may be collectively referred to as the strain generation parts 13.

Each of the strain generation parts 13 includes a first connection part 131, a first branch part 132, a second branch part 133 and a second connection part 134. The first connection part 131 is a part connected to the first structure 11. The first connection part 131 is positioned on the X-axis or the Y-axis. The first branch part 132 is a set of beam-like parts which branch into two from the first connection part 131 toward the second structure 12 and extend in directions separating from each other. The second branch part 133 is a set of beam-like parts which are connected to the first branch part 132 with bent parts interposed therebetween and extend in the direction of approaching each other. The second connection part 134 is a part where the branched parts of the second branch part 133 join and connects to the second structure 12. The second connection part 134 is positioned on the same axis as the axis where the first connection part 131 is positioned.

The force sensor 10 is formed so that, when projected in a direction perpendicular to the reference plane F10 (XY Plane), i.e., in the Z-axis direction, the strain generation parts 13 become line-symmetric with each other with respect to both the X-axis and the Y-axis. For example, the strain generation part 13A and the strain generation part 13C are line-symmetric with respect to the Y-axis, and the strain generation part 13A and the strain generation part 13C are also line-symmetric with respect to the X-axis.

The strain generation parts 13 according to this embodiment are formed four-fold symmetric with respect to the Z-axis. That is, the strain generation parts 13 are formed in such a way that the shapes of the strain generation parts 13 after the force sensor 10 is rotated by 90 degrees around the Z-axis become the same as the shapes of the strain generation parts 13 before the force sensor 10 is rotated by 90 degrees. For example, the shape of the strain generation part 13A projected onto the XY plane is the same as the shape of the strain generation part 13B when the force sensor 10 is rotated clockwise by 90 degrees around the Z-axis. With the above-described shape of the force sensor 10, when a force in each axial direction and a moment about each axis, which are external forces, are applied, the force sensor generates in-plane strain and out-of-plane strain as shown below.

The in-plane strain is strain in the strain generation part generated in the reference plane F10 when the external force is applied to the force sensor 10. The in-plane strain is caused by a force Fx in the X-axis direction, a force Fy in the Y-axis direction, and a moment Mz about the Z-axis. When Fx is applied to the force sensor 10, the strain is suitably generated in the strain generation part 13A to the strain generation part 13D, and the first structure 11 is displaced parallel to the X-axis. When the force Fy is applied to the force sensor 10, the strain is suitably generated in the strain generation part 13A to the strain generation part 13D, and the first structure 11 is displaced parallel to the Y-axis. When the moment Mz is applied to the force sensor 10, the strain is uniformly generated in each of the strain generation parts 13A to 13D, and the first structure 11 is rotated around the Z-axis.

The out-of-plane strain is strain in the strain generation part generated outside the reference plane F10 when the external force is applied to the force sensor 10. The out-of-plane strain is caused by a force Fz in the Z-axis direction, a moment Mx about the X-axis, and a moment My about the Y-axis. When Fz is applied to the force sensor 10, the strain is uniformly generated in each of the strain generation parts 13A to 13D, and the first structure 11 is displaced parallel to the Z-axis. When Mx is applied to the force sensor 10, the strain is suitably generated in the strain generation parts 13A to 13D, and the first structure 11 rotates about the X-axis. When the moment My is applied to the force sensor 10, the strain is suitably generated in the strain generation parts 13A to 13D, and the first structure 11 rotates around the Y-axis.

As described above, since the shapes of the strain generation parts 13 have symmetry, the amounts of strain in the strain generation parts 13 have symmetry when the external force is applied. Thus, the force sensor 10 can arrange the strain sensors so as to detect the external force without performing a complicated decoupling calculation.

Note that the first branch part 132 and the second branch part 133 need not be linearly extended and instead may be curved, or the widths and thickness of the first branch part 132 and the second branch part 133 may vary. Further, the first connection part 131 and the first branch part 132 are gradually changed and are not clearly defined, and the boundary part between them may belong to either the first connection part 131 or the first branch part 132. The same is applied to the boundary between the first branch part 132 and the second branch part 133 and the boundary between the second branch part 133 and the second connection part 134. The boundary between the first structures 11 and the strain generation parts 13 and the boundary between the strain generation part 13 and the second structure are also gradually changed and are not clearly defined.

Figure 3:
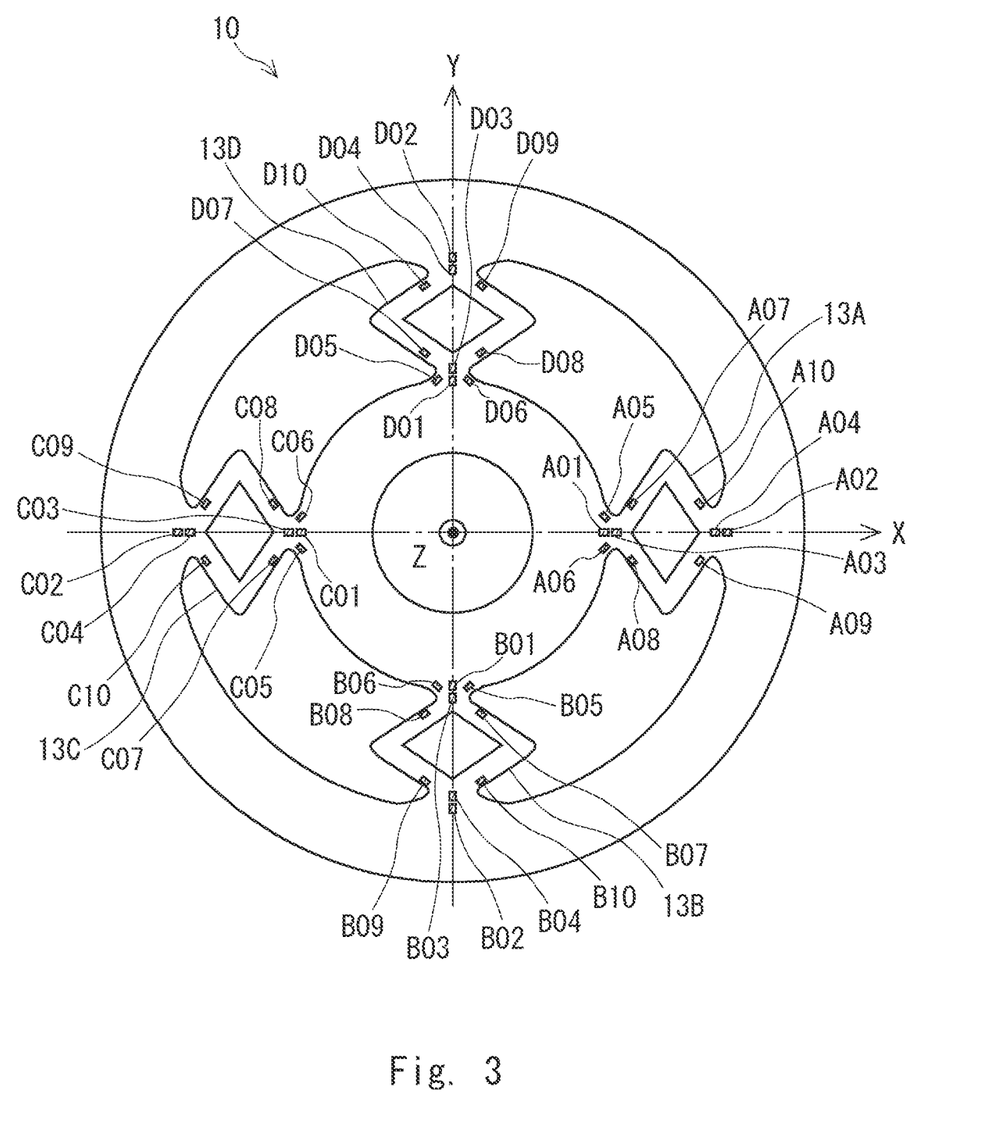
FIG. 3 is a front view of an arrangement of strain sensors in the force sensor.

Next, the arrangement of the strain sensors 14 will be described with reference to FIG. 3. FIG. 3 is a front view showing the arrangement of the strain sensors in the force sensor 10.

Each of the strain generation parts 13A to 13D includes ten strain sensors 14. The ten strain sensors 14 included in each of the strain generation parts 13A to 13D are arranged at positions at which the strain generation parts 13A to 13D are relatively four-fold symmetric with respect to the Z-axis. As a representative example, the arrangement of the strain sensors 14 included in the strain generation part 13A will be described below.

The strain generation part 13A includes ten strain sensors 14 defined as sensors A01 to A10. The sensor A01 is provided on the X-axis in the first connection part 131. The sensor A02 is provided on the X-axis in the second connection part 134. The sensor A03 is provided at a position where it does not overlap the sensor A01 on the X-axis in the first connection part 131. The sensor A04 is provided at a position where it does not overlap the sensor A02 on the X-axis in the second connection part 134. The sensor A05 and the sensor A06 are provided at positions symmetric with respect to the X-axis across the X-axis in the first connection part 131. The sensor A07 and the sensor A08 are provided at positions symmetric with respect to the X-axis across the X-axis in the first branch part 132. The sensor A09 and the sensor A10 are provided at positions symmetric with respect to the X-axis across the X-axis in the second branch part 133.

In some embodiments, the sensors A07 to A10 are positioned far from a neutral plane when the in-plane strain is generated in the strain generation parts 13. In some embodiments, the sensor A07 and the sensor A08 are arranged so as to sandwich the neutral plane of the in-plane strain of the beams where the sensor A07 and the sensor A08 are arranged. In some embodiments, the sensor A09 and the sensor A10 are arranged so as to sandwich the neutral plane of the in-plane strain of the beams where the sensor A09 and the sensor A10 are arranged. By doing so, the force sensor 10 can detect the in-plane strain with high sensitivity.

Like the above-described strain generation part 13A, the strain generation parts 13B, 13C, and 13D each include ten strain sensors 14. As shown in FIG. 3, each of the sensors included in each of the strain generation parts is labeled with a combination of an alphabet and a numeral, where the alphabets A to D correspond to the strain generation parts 13A to 13D, respectively, and numerals 01 to 10 correspond to the arrangement of the sensors.

Next, a strain sensor pair and a sensor group will be described with reference to FIGS. 4 to 9. Each of the strain sensors 14 of the force sensor 10 constitutes the strain sensor pair. Each strain sensor pair is an element for constituting one bridge circuit. The sensor group includes a plurality of the strain sensor pairs, and one sensor group includes the bridge circuits for detecting a corresponding axial force or a corresponding axial moment. The force sensor 10 includes a first sensor group SG1 to a sixth sensor group SG6.

In the bridge circuit according to this embodiment, an input voltage Vi is applied to one end of a parallel circuit, which is composed of two strain sensors connected in parallel, and the other end of the parallel circuit is grounded. An output voltage Vo of an intermediate part of the parallel circuit is output. When the strain sensors constituting the bridge circuit expand/contract due to the strain in the strain generation part 13, the resistance value of the expanded/contracted strain sensor 14 changes. Thus, when the strain sensor 14 detects strain, a value of the output voltage Vo changes accordingly.

Figure 4:
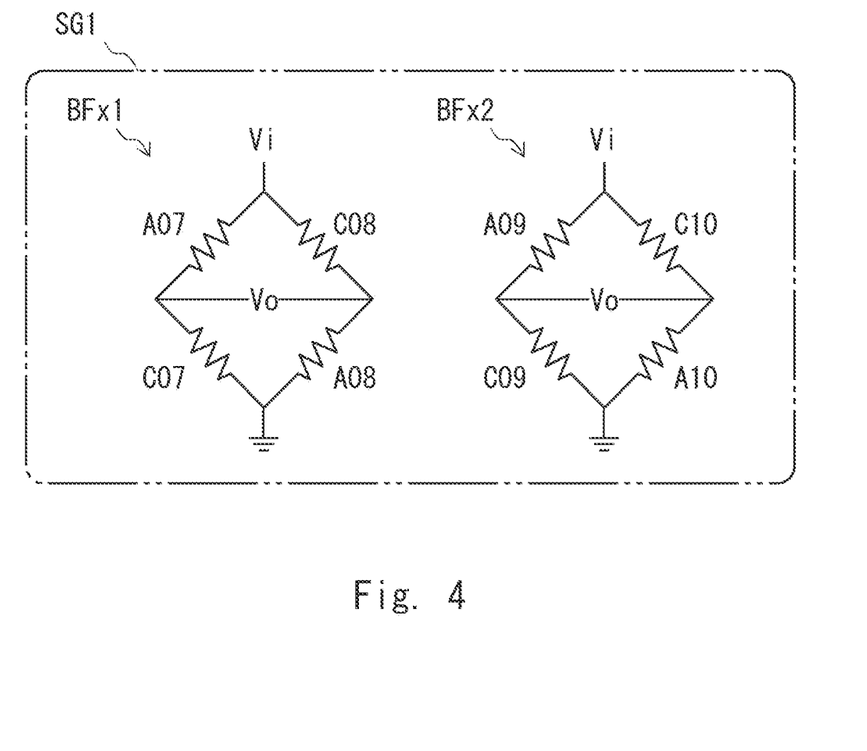
FIG. 4 is a circuit diagram of bridge circuits included in a first sensor group.

FIG. 4 is a circuit diagram of the first sensor group SG1. The force sensor 10 includes the first sensor group SG1 for detecting the force Fx. In the illustrated circuit diagram, each resistor represents the strain sensor 14. The first sensor group SG1 includes a bridge circuit BFx1 and a bridge circuit BFx2.

The bridge circuit BFx1 includes the sensors A07, A08, C07, and C08 as four strain sensors 14. The sensor A07 and the sensor A08 are arranged at positions symmetric with respect to the X-axis, and constitute one strain sensor pair. Likewise, the sensor C07 and the sensor C08 are arranged at positions symmetric with respect to the X-axis, and constitute one strain sensor pair. The bridge circuit BFx2 includes the sensors A09, A10, C09, and C10.

The sensor A09 and the sensor A10 are arranged at positions symmetric with respect to the X-axis, and constitute one strain sensor pair. Likewise, the sensor C09 and the sensor C10 are arranged at positions symmetric with respect to the X-axis, and constitute one strain sensor pair.

The first sensor group SG1 detects the force Fx in accordance with the following Formula (1).

[Equation 1]

$$Fx=((RA07+RA08)-(RC07+RC08))+((RA09+RA10)-(RC09+RC10)) \quad (1)$$

Each term on the right side of Formula (1) represents a change in the resistance value of each sensor. For example, when the resistance value of the sensor A07 is increased due to the strain in the strain generation part 13, "(+)" is applied to the RA07. Alternatively, when the resistance value of the sensor A07 decreases, "(−)" is applied to the RA07. When there is no change in the resistance value of the sensor A07, "(0)" is applied. The same applies to the following force or moment equations.

Next, an output of the first sensor group SG1 when a predetermined external force is applied to the force sensor 10 will be described. The first sensor group SG1 is represented as follows when a force in each axial direction and a moment about each axis are applied.

$$Fx+=(((+)+(+))-((-)+(-)))+(((+)+(+))-((-)+(-)))=8(+)$$

$$Fy+=(((+)+(-))-((-)+(+)))+(((+)+(-))-((-)+(+)))=0$$

$$Fz+=(((+)+(+))-((+)+(+)))+(((-)+(-))-((-)+(-)))=0$$

$$Mx+=(((-)+(+))-((+)+(-)))+(((-)+(+))-((+)+(-)))=0$$

$$My+=(((-)+(-))-((+)+(+)))+(((+)+(+))-((-)+(-)))=0$$

$$Mz+=(((+)+(-))-((+)+(-)))+(((-)+(+))-((-)+(+)))=0 \quad \text{[Equation 2]}$$

In this formula Fx+ is a force in the X-axis positive direction, Fy+ is a force in the Y-axis positive direction, Fz+ is a force in the Z-axis positive direction, Mx+ is a moment about the X-axis in the positive direction, My+ is the moment about the Y-axis in the positive direction, and Mz+ is the moment about the Z-axis in the positive direction. In this embodiment, the positive direction of the moment is a direction of clockwise rotation when the positive side of the corresponding axis is viewed from the negative side.

As shown above, the first sensor group SG1 becomes 8 (+) when the force Fx+ in the X-axis positive direction is applied. Thus, the Fx detection circuit detects Fx with high sensitivity. On the other hand, when an external force in a direction other than the X-axis positive direction is applied to the first sensor group SG1, the change in the resistance values of the strain sensors 14 of the sensor group becomes (+) or (−) due to the expansion and contraction of the corresponding sensor, but consequently becomes zero, because the expansion and contraction of the respective sensors have symmetry. In other words, the output of the first sensor group SG1 is in equilibrium with the external force that is not the force Fx.

Figure 5:
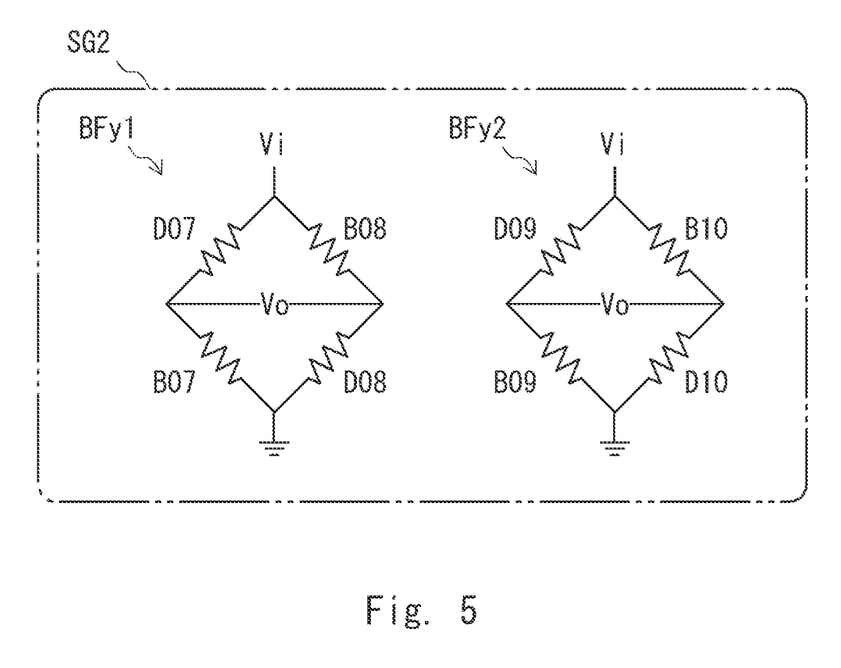
FIG. 5 is a circuit diagram of bridge circuits included in a second sensor group.

FIG. 5 is a circuit diagram of the second sensor group SG2. The force sensor 10 includes the second sensor group SG2 for detecting the force Fy. The second sensor group SG2 includes a bridge circuit BFy1 and a bridge circuit BFy2.

The bridge circuit BFy1 includes the sensors the D07, D08, B07, and B08. The sensor D07 and the sensor D08 are arranged at positions symmetric with respect to the Y-axis, and constitute one strain sensor pair. Likewise, the sensor B07 and the sensor B08 are arranged at positions symmetric with respect to the Y-axis, and constitute one strain sensor pair.

The sensors D09 and D10 are arranged at positions symmetric with respect to the Y-axis, and constitute one strain sensor pair. Likewise, the sensor B09 and the sensor B10 are arranged at positions symmetric with respect to the Y-axis, and constitute one strain sensor pair.

The second sensor group SG2 detects the force Fy in accordance with the following Formula (2).

[Equation 3]

$$Fy=((RD07+RD08)-(RB07+RB08))+((RD09+RD10)-(RB09+RB10)) \quad (2)$$

Next, an output of the second sensor group SG2 when a predetermined external force is applied to the force sensor 10 will be described. The second sensor group SG2 is represented as follows when a force in each axial direction and a moment about each axis are applied.

$$Fx+=(((+)+(-))-((-)+(+)))+(((+)+(-))-((-)+(+)))=0$$

$$Fy+=(((+)+(+))-((-)+(-)))+(((+)+(+))-((-)+(-)))=8(+)$$

$$Fz+=(((+)+(+))-((+)+(+)))+(((-)+(-))-((-)+(-)))=0$$

$$Mx+=(((-)+(+))-((+)+(-)))+(((-)+(+))-((+)+(-)))=0$$

$$My+=(((-)+(-))-((+)+(+)))+(((+)+(+))-((-)+(-)))=0$$

$$Mz+=(((+)+(-))-((+)+(-)))+(((-)+(+))-((-)+(+)))=0 \quad \text{[Equation 4]}$$

As shown above, the second sensor group SG2 becomes 8 (+) when the force Fy+ in the Y-axis positive direction is applied. Thus, the Fy detection circuit detects Fy with high sensitivity. On the other hand, when an external force in a direction other than the Y-axis positive direction is applied to the second sensor group SG2, the change in the resistance values of the strain sensors 14 of the sensor group becomes (+) or (−) due to the expansion and contraction of the corresponding sensor, but consequently becomes zero, because the expansion and contraction of the respective sensors have symmetry.

Figure 6:
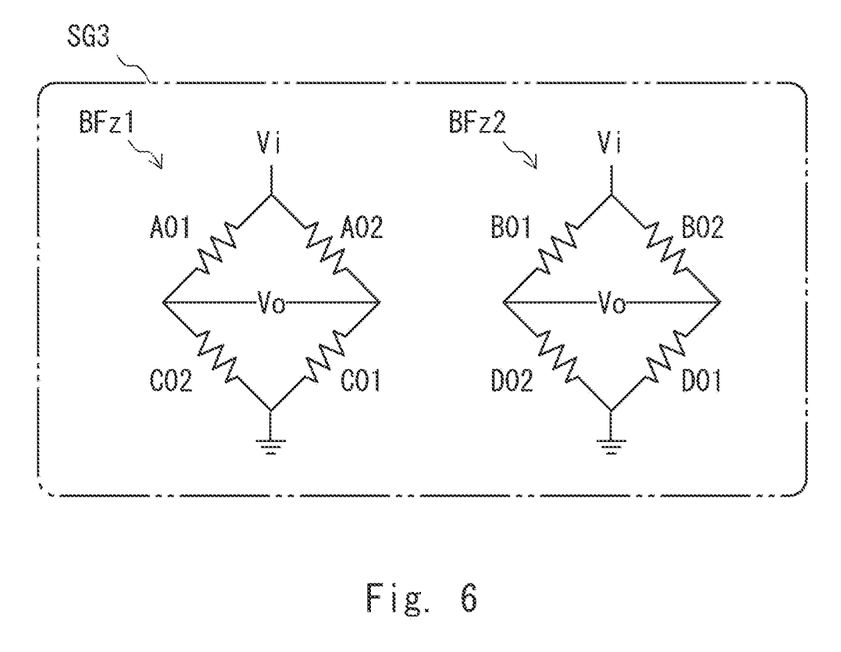
FIG. 6 is a circuit diagram of bridge circuits included in a third sensor group.

FIG. 6 is a circuit diagram of the third sensor group SG3. The force sensor 10 includes the third sensor group SG3 for detecting the force Fz. The third sensor group SG3 includes a bridge circuit BFz1 and a bridge circuit BFz2. The bridge circuit BFz1 includes the sensors A01, C01, A02, and C02. The sensors A01 and C01 are arranged at positions symmetric with respect to the Y-axis, and constitute one strain sensor pair. Likewise, the sensor A02 and the sensor C02 are arranged at positions symmetric with respect to the Y-axis, and constitute one strain sensor pair.

The bridge circuit BFz2 includes the sensors B01, D01, B02, and D02. The sensor B01 and the sensor D01 are arranged at positions symmetric with respect to the X-axis, and constitute one strain sensor pair. Likewise, the sensor B02 and the sensor D02 are arranged at positions symmetric with respect to the X-axis, and constitute one strain sensor pair.

The third sensor group SG3 detects the force Fz in accordance with the following Formula (3).

[Equation 5]

$$Fz=((RA01+RC01)-(RA02+RC02))+((RB01+RD01)-(RB02+RD02)) \quad (3)$$

Next, an output of the third sensor group SG3 when a predetermined external force is applied to the force sensor 10 will be described. The third sensor group SG3 is represented as follows when a force in each axial direction and a moment about each axis are applied.

$$Fx+=(((0)+(0))-((0)+(0)))+(((0)+(0))-((0)+(0)))=0$$

$$Fy+=(((0)+(0))-((0)+(0)))+(((0)+(0))-((0)+(0)))=0$$

$$Fz+=(((+)+(+))-((-)+(-)))+(((+)+(+))-((-)+(-)))=8(+)$$

$$Mx+=(((0)+(0))-((0)+(0)))+(((-)+(+))-((+)+(-)))=0$$

$$My+=(((-)+(+))-((+)+(-)))+(((0)+(0))-((0)+(0)))=0$$

$$Mz+=(((0)+(0))-((0)+(0)))+(((0)+(0))-((0)+(0)))=0 \quad \text{[Equation 6]}$$

As shown above, the third sensor group SG3 becomes 8 (+) when the force Fz+ in the Z-axis positive direction is applied. Thus, the Fz detection circuit detects Fz with high sensitivity. On the other hand, when an external force in a direction other than the Z-axis positive direction is applied to the third sensor group SG3, the resistance values of the strain sensors 14 do not change (the change is 0) in most cases, i.e., the strain sensors 14 are insensible to the external force in a direction other than the Z-axis positive direction in most cases. When Mx+ and My+ are applied, the change in the resistance values of the strain sensors 14 of the sensor group becomes (+) or (−) due to the expansion and contraction of some of the strain sensors 14. However, the output of the third sensor group SG3 consequently becomes zero, because the expansion and contraction of the respective sensors have symmetry.

Figure 7:
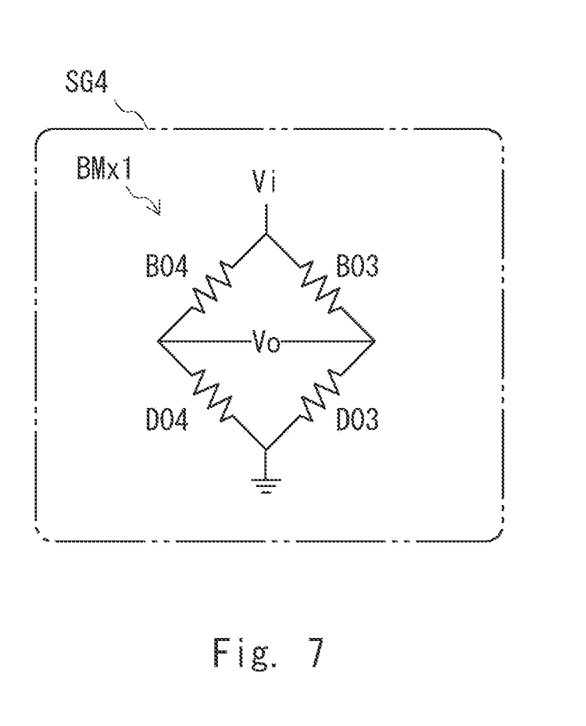
FIG. 7 is a circuit diagram of bridge circuits included in a fourth sensor group.

FIG. 7 is a circuit diagram of the fourth sensor group SG4. The force sensor 10 includes the fourth sensor group SG4 for detecting a moment Mx. The fourth sensor group SG4 includes a bridge circuit BMx1.

The bridge circuit BMx1 includes the sensors B03, D03, B04, and D04. The sensors B03 and the sensor D03 are arranged at positions symmetric with respect to the X-axis, and constitute one strain sensor pair. The sensor B04 and the sensor D04 are arranged at positions symmetric with respect to the X-axis, and constitute one strain sensor pair.

The fourth sensor group SG4 detects the moment Mx in accordance with the following Formula (4).

[Equation 7]

$$Mx=(RD03-RB03)+(RB04-RD04) \quad (4)$$

Next, an output of the fourth sensor group SG4 when a predetermined external force is applied to the force sensor 10 will be described. The fourth sensor group SG4 is represented as follows when a force in each axial direction and a moment about each axis are applied.

$$Fx+=(((0)-(0))+((0)-(0)))=0$$

$$Fy+=(((0)-(0))+((0)-(0)))=0$$

$$Fz+=(((+)-(+))+((-)-(-)))=0$$

$$Mx+=(((+)-(-))+((+)-(-)))=4(+)$$

$$My+=(((0)-(0))+((0)-(0)))=0$$

$$Mz+=(((0)-(0))+((0)-(0)))=0 \quad \text{[Equation 8]}$$

Thus, the fourth sensor group SG4 becomes 4 (+) when the moment Mx+ about the X-axis positive direction is applied. Thus, the Mx detection circuit detects Mx with high sensitivity. On the other hand, when an external force in a direction other than the X-axis positive direction is applied to the fourth sensor group SG4, the resistance values of the strain sensors 14 do not change (the change is 0) in most cases. When Fz+ is applied, the change in the resistance values of the strain sensors 14 of the sensor group becomes (+) or (−) due to the expansion and contraction of some of the strain sensors 14. However, the output of the fourth sensor group SG4 consequently becomes zero, because the expansion and contraction of the respective sensors have symmetry.

Figure 8:
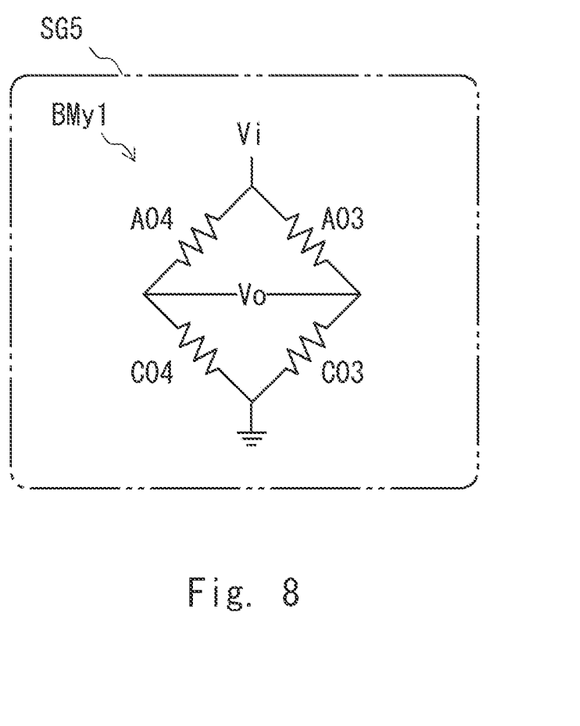
FIG. 8 is a circuit diagram of bridge circuits included in a fifth sensor group.

FIG. 8 is a circuit diagram of the fifth sensor group SG5. The force sensor 10 includes the fifth sensor group SG5 for detecting a moment My. The fifth sensor group SG5 includes a bridge circuit BMy1.

The bridge circuit BMy1 includes the sensors A03, C03, A04, and C04. The sensor A03 and the sensor C03 are arranged at positions symmetric with respect to the Y-axis, and constitute one strain sensor pair. The sensor A04 and the sensor C04 are arranged at positions symmetric with respect to the Y-axis, and constitute one strain sensor pair.

The fifth sensor group SG5 detects the moment My in accordance with the following Formula (5).

[Equation 9]

$$My=(RC03-RA03)+(RA04-RC04) \quad (5)$$

Next, an output of the fifth sensor group SG5 when a predetermined external force is applied to the force sensor 10 will be described. The fifth sensor group SG5 is represented as follows when a force in each axial direction and a moment about each axis are applied.

$$Fx+=(((0)-(0))+((0)-(0)))=0$$

$$Fy+=(((0)-(0))+((0)-(0)))=0$$

$$Fz+=(((+)-(+))+((-)-(-)))=0$$

$$Mx+=(((0)-(0))+((0)-(0)))=0$$

$$My+=(((+)-(-))+((+)-(-)))=4(+)$$

$$Mz+=(((0)-(0))+((0)-(0)))=0 \quad \text{[Equation 10]}$$

Thus, the fifth sensor group SG5 becomes 4 (+) when the moment My+ about the Y-axis positive direction is applied. Thus, the My detection circuit detects My with high sensitivity. On the other hand, when an external force in a direction other than the Y-axis positive direction is applied to the fifth sensor group SG5, the resistance values of the strain sensors 14 do not change (the change is 0) in most cases. When Fz+ is applied, the change in the resistance values of the strain sensors 14 of the sensor group becomes (+) or (−) due to the expansion and contraction of some of the strain sensors 14. However, the output of the fifth sensor group SG5 consequently becomes zero, because the expansion and contraction of the respective sensors have symmetry.

Figure 9:
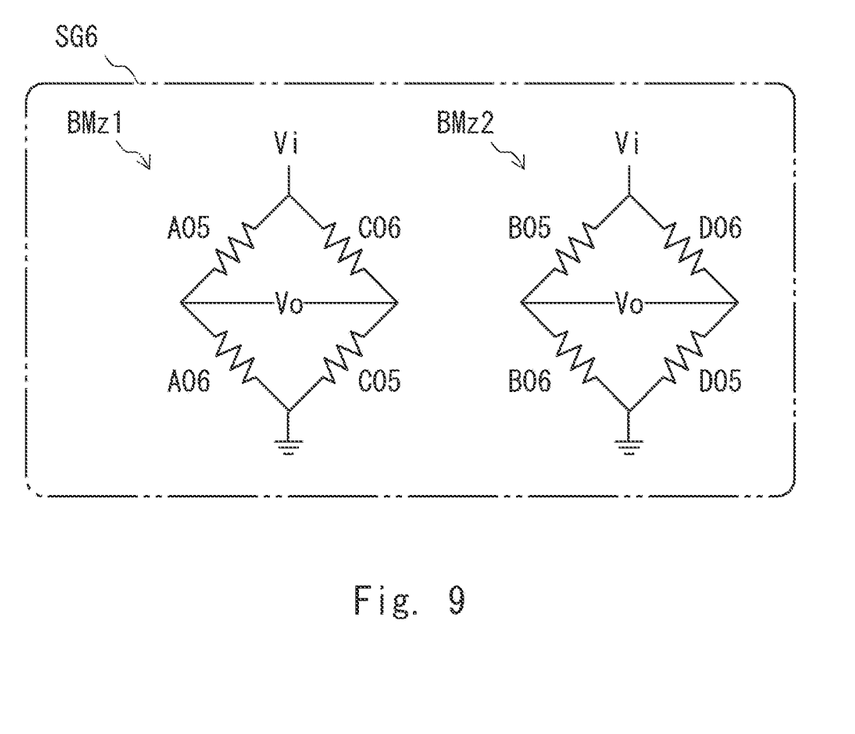
FIG. 9 is a circuit diagram of bridge circuits included in a sixth sensor group.

FIG. 9 is a circuit diagram of the sixth sensor group SG6. The force sensor 10 includes the sixth sensor group SG6 for detecting a moment Mz. The sixth sensor group SG6 includes a bridge circuit BMz1 and a bridge circuit BMz2.

The bridge circuit BMz1 includes the sensors A05, C06, C05, and A06. The sensor A05 and the sensor C06 are arranged at positions symmetric with respect to the Y-axis, and constitute one strain sensor pair. Likewise, the sensor C05 and the sensor A06 are arranged at positions symmetric with respect to the Y-axis, and constitute one strain sensor pair.

The bridge circuit BMz2 includes the sensors B05, D06, D05, and B06. The sensor B05 and the sensor D06 are arranged at positions symmetric with respect to the X-axis, and constitute one strain sensor pair. Likewise, the sensor D05 and the sensor B06 are arranged at positions symmetric with respect to the X-axis, and constitute one strain sensor pair.

The sixth sensor group SG6 detects the moment Mz in accordance with the following Formula (6).

[Equation 11]

$$Mz = ((RA05 + RA05) - (RA06 + RC06)) + ((RB05 + RD05) - (RB06 + RD06)) \quad (6)$$

Next, an output of the sixth sensor group SG6 when a predetermined external force is applied to the force sensor 10 will be described. The sixth sensor group SG6 is represented as follows when a force in each axial direction and a moment about each axis are applied.

$$Fx+ = (((-)+(+))-((-)+(+)))+(((+)+(-))-((-)+(+))) = 0$$

$$Fy+ = (((+)+(-))-((-)+(+)))+(((+)+(-))-((+)+(-))) = 0$$

$$Fz+ = (((+)+(+))-((+)+(+)))+(((+)+(+))-((+)+(+))) = 0$$

$$Mx+ = (((+)+(-))-((-)+(+)))+(((-)+(+))-((-)+(+))) = 0$$

$$My+ = (((-)+(+))-((-)+(+)))+(((-)+(+))-((+)+(-))) = 0$$

$$Mz+ = (((+)+(+))-((-)+(-)))+(((+)+(+))-((-)+(-))) = 8(+) \quad \text{[Equation 12]}$$

As shown above, the sixth sensor group SG6 becomes 8 (+) when the moment Mz+ about the Z-axis positive direction is applied. Thus, the Mz detection circuit detects Mz with high sensitivity. On the other hand, when an external force in a direction other than the Z-axis positive direction is applied to the sixth sensor group SG6, the output of the sixth sensor group SG6 becomes (+) or (−) due to the expansion and contraction of the corresponding strain sensor 14, but consequently becomes zero, because the expansion and contraction of the respective sensors have symmetry.

As described above, the force sensor 10 is arranged in such a way that the shapes of the strain generation parts 13 become symmetric with respect to the X-axis and the Y-axis, the shapes of the strain generation parts 13 become four-fold symmetric with respect to the Z-axis, and the strain sensors become symmetric with respect to the X-axis and the Y-axis, and the strain sensors become four-fold symmetric with respect to the -axis. Therefore, when the force sensor 10 detects the force in each axial direction and the moment about each axial direction, the force sensor can detect the external force in each direction separately without performing a complicated decoupling calculation.

Next, a multiplex configuration employed by the force sensor 10 according to the embodiment will be described. A force sensor mounted on various actuators is expected to have high reliability in some cases. Therefore, the force sensor 10 according to the embodiment uses a plurality of strain sensors when detecting an external force in a predetermined direction.

More specifically, as shown in FIG. 4, the force sensor 10 uses the bridge circuit BFx1 and the bridge circuit BFx2 when detecting Fx. In this way, the force sensor 10 detects outputs from the two bridge circuits when detecting an external force in one direction. With such a configuration, the force sensor 10 prevents or minimizes deterioration in reliability.

Similarly, by detecting signals from the two bridge circuits in the Fy detection circuit shown in FIG. 5, the Fz detection circuit shown in FIG. 6, and the Mz detection circuit shown in FIG. 9, the force sensor 10 according to the embodiment realizes multiplexing of the detection circuits.

Although an example is shown in which the moment Mx shown in FIG. 7 and the moment My shown in FIG. 8 are not multiplexed, the moment Mx and the moment My can be multiplexed. Specifically, for example, when the Mx detection circuit is multiplexed, one strain sensor pair may be arranged on the Y-axis of the strain generation part 13B, and another strain sensor pair may be arranged on the Y-axis of the strain generation part 13D at positions symmetric with respect to the X-axis.

Although the force sensor 10 according to the embodiment is shown as an example in which multiplexing using the plurality of bridge circuits is employed, the force sensor 10 according to the embodiment is not limited to this and may be configured not to employ multiplexing. In this case, the force sensor 10 may include, for example, the bridge circuit BFx1 in the first sensor group SG1 and may not include the bridge circuit BFx2. As described above, whether or not the multiplexing is performed, the force sensor 10 can detect the external force without performing a decoupling calculation by arranging the strain sensor pairs in a symmetric manner with respect to the X-axis and the Y-axis.

Further, although the force sensor 10 is shown as an example of a six-axis force sensor, the force sensor 10 may detect one or more external forces from among forces along the six axes. For example, if the force sensor 10 includes only the first sensor group SG1, it can detect only Fx.

Further, in the force sensor 10 described above, an example is shown in which the shape of the strain generation part 13 is four-fold symmetric. Alternatively, the force sensor 10 may be symmetric with respect to the X and Y axes and may not be four-fold symmetric. Similarly, the arrangement of strain sensors 14 may be symmetric with respect to the X and Y axes and not four-fold symmetric. Specifically, for example, the force sensor may be elliptical, and the strain generation part extending on the same axis may be symmetric and not four-fold symmetric.

The embodiment has been described above. According to the embodiment, it is possible to provide a force sensor that does not require complicated calculations.

Note that the present disclosure is not limited to the above-described embodiment, and may be modified as appropriate without departing from the spirit of the disclosure.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A force sensor for detecting at least one of a force in each axial direction and a moment about each axis of a Cartesian coordinate system including a first axis, a second axis, and a third axis orthogonal to each other, the force sensor comprising:
    a first structure being a hollow cylinderical structure formed in such a way that the third axis passes therethrough;
    four strain generation parts each extending radially from the first strucutre along the first axis and the second axis on a reference plane formed by the first axis and the second axis;
    a second structure surrounding the first strucutre and connected to the first structure with the strain generation parts interposed therebetween, wherein
    each of the strain generation parts comprises a first connection part connected to the first structure, a first branch part, which is a pair of beam-like parts branching into two from the first connection part toward the second structure and extending in directions separating from each other, a second branch part, which is a pair of beam-like parts both connected to the first branch part with bent parts interposed therebetween and extending in directions approaching each other, and a second connection part where branched parts of the second branch part join and connects to the second structure, and
    the strain generation parts are and are formed in such a way that the strain generation parts become line-symmetric with respect to both the first axis and the second axis when the strain generation parts are projected in a direction perpendicular to the reference plane.

2. The force sensor according to claim 1, further comprising a plurality of strain sensor pairs on the reference plane of the strain generation parts, wherein
    the plurality of strain sensor pairs are arranged in such a way that the strain sensor pairs become line-symmetric with respect to both the first axis and the second axis when the plurality of strain sensor pairs are projected in a direction perpendicular to the reference plane.

3. The force sensor according to claim 2, further comprising at least one of:
    a first sensor group including the plurality of strain sensor pairs arranged in at least one of the first branch part and the second branch part of the strain generation part formed along the first axis;
    a second sensor group including the plurality of strain sensor pairs arranged in at least one of the first branch part and the second branch part of the strain generation part formed along the second axis;
    a third sensor group including the plurality of strain sensors arranged in the first connection part and the second connection part on the first axis or the second axis;
    a fourth sensor group including the plurality of strain sensor pairs arranged in the first connection part and the second connection part on the second axis;
    a fifth sensor group including the plurality of strain sensor pairs arranged in the first connection part and the second connection part on the first axis; and
    a sixth sensor group including at least either of the plurality of strain sensor pairs arranged across the first axis in the first connection part provided on the first axis or the plurality of strain sensor pairs arranged across the second axis in the first connection part provided on the second axis.

4. The force sensor according to claim 3, wherein
    the strain generation parts are formed so as to be four-fold symmetric with respect to the third axis, and
    the plurality of strain sensor pairs are arranged so as to be four-fold symmetric with respect to the third axis.

5. The force sensor according to claim 3, further comprising at least one of:
    a first force detection circuit including a bridge circuit and configured to detect a force in a direction of the first axis, the bridge circuit including the plurality of strain sensor pairs included in the first sensor group;
    a second force detection circuit including a bridge circuit and configured to detect a force in a direction of the second axis, the bridge circuit including the plurality of strain sensor pairs included in the second sensor group;
    a third force detection circuit including a bridge circuit and configured to detect a force in a direction of the third axis, the bridge circuit including the plurality of strain sensor pairs included in the third sensor group;
    a first moment detection circuit including a bridge circuit and configured to detect a moment about the first axis, the bridge circuit including the plurality of strain sensor pairs included in the fourth sensor group;
    a second moment detection circuit including a bridge circuit and configured to detect a moment about the second axis, the bridge circuit including the plurality of strain sensor pairs included in the fifth sensor group; and
    a third moment detection circuit including a bridge circuit and configured to detect a moment about the third axis, the bridge circuit including the plurality of strain sensor pairs included in the sixth sensor group.

6. The force sensor according to claim 5, wherein
    the first sensor group includes the plurality of strain sensor pairs in both the first branch part and the second branch part, so that the first sensor group includes two bridge circuits.

7. The force sensor according to claim 5, wherein
    the second sensor group includes the plurality of strain sensor pairs in both the first branch part and the second branch part, so that the second sensor group includes two bridge circuits.

8. The force sensor according to claim 5, wherein
    the third sensor group includes the plurality of strain sensor pairs in the first connection part and the second connection part on the first axis and the second axis, so that the third sensor group includes two bridge circuits.

9. The force sensor according to claim 5, wherein
    the sixth sensor group includes the plurality of strain sensor pairs in both the first connection part provided on the first axis and the first connection part provided on the second axis, so that the six sensor group includes two bridge circuits.

\* \* \* \* \*